(No Model.)
T. F. WOOD.
CLOTHES WASHER.
No. 323,768. Patented Aug. 4, 1885.
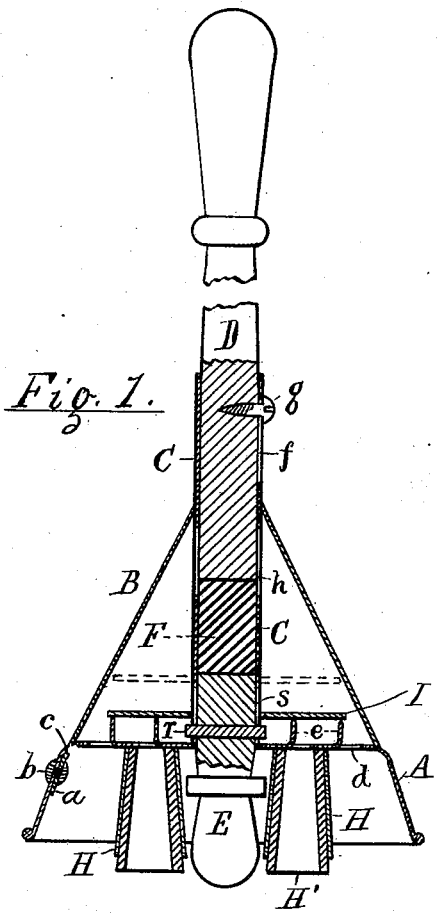
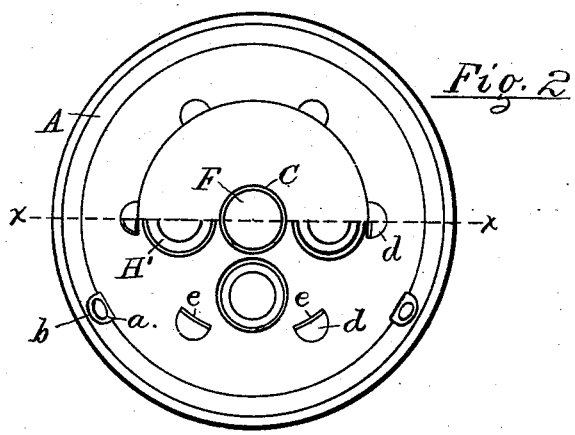
Attest.
H. J. Theberath.
L. Lee.
Inventor.
Theodore F. Wood per
Thos. S. Crane, Atty.

United States Patent Office.

THEODORE F. WOOD, OF VERNON, NEW JERSEY.

CLOTHES-WASHER.

SPECIFICATION forming part of Letters Patent No. 323,768, dated August 4, 1885.

Application filed March 8, 1884. (No model.)

*To all whom it may concern:*

Be it known that I, THEODORE F. WOOD, a citizen of the United States, residing in Vernon, Sussex county, New Jersey, have invented certain new and useful Improvements in Clothes-Washers, fully described and represented in the following specification and the accompanying drawings, forming a part of the same.

This invention consists in certain constructive features in a conical tin clothes-pounder, as hereinafter fully described, and pointed out in the claims.

The invention will be understood by reference to the drawings, in which Figure 1 is an internal view of the same, in section, at the center line, as at $x$ $x$ in Fig. 2. Fig. 2 shows at its lower half a bottom view of the pounder and at its upper half an inside view of the disk I above the apertures in the diaphragm.

A is an inverted pan, of stamped tin; B, a cone attached to the same by solder and by tongues $a$, formed on the cone and riveted to the inside of the pan at $b$ after passing through holes $c$ in the bottom of the pan. The bottom of the pan is perforated at $d$ by punching lugs $e$ from the holes and bending the same upward. A handle-socket, C, is secured to the bottom of the pan and projects above the cone B, being slotted at $f$ to receive a screw, $g$, inserted into the handle D.

E is a buffer, secured in the socket C by a rivet, $r$, which moves in a slot, $s;$ and F is a spring formed of a block of india-rubber inserted in the socket between the buffer and lower end of handle D.

H are pressers, formed as short tubes, secured inside the pan A and projecting slightly below its edge, the buffer E projecting a little farther than the pressers. Rubber thimbles H' are secured inside the pressers, and their ends projected to cause an elastic pressure when in use.

The tongues $a$ and rivets $b$ serve to hold the parts together much more durably than solder alone. The rubber thimbles H' operate more effectively and less injuriously upon the clothing than metallic pressers, and the buffer E produces a much less jarring blow when the pounder is in use.

The slots $f$ and $s$ afford movement to the buffer and handle, while the fastenings $g$ and $r$ retain said parts conveniently in their places.

A movable disk, I, is inserted inside the cone B, and rests upon the lugs $e$ until the pounder is pressed upon the clothing, the fluid then partially entering the cone and raising the disk to the position indicated by dotted lines I' in Fig. 1. When the pounder is lifted, the disk falls to its first position, and thus prevents a rapid escape of the fluid contained in the cone.

It is obvious that the construction shown effects results not attained by others of more complicated construction; and I therefore claim my improvements in the following manner:

1. In a clothes-pounder, the combination, with the pan A, having the holes $c$, of the cone B, formed with lugs $a$, secured to the pan by rivets $b$, substantially as set forth.

2. The combination, with the pan A, cone B, and handle D, of the pressers H, provided with the rubber thimbles H', substantially as shown and described.

3. The combination, with the pan A, provided with the holes $d$ and lugs $e$, bent upward, as described, of the cone B and the movable disk I, arranged and operated as herein shown and described.

In testimony whereof I have hereunto set my hand in the presence of two subscribing witnesses.

THEODORE F. WOOD.

Witnesses:
 THOS. S. CRANE,
 A. VAN ARSDALE.